United States Patent [19]
Rogers et al.

[11] 3,790,810
[45] Feb. 5, 1974

[54] DIRECT CURRENT POWER SUPPLY FOR ELECTRICAL APPLIANCES

[75] Inventors: Fred A. Rogers, Brooklyn; David Berend, New York, both of N.Y.

[73] Assignee: J. Wiss & Sons Co., Newark, N.J.

[22] Filed: June 30, 1972

[21] Appl. No.: 268,098

[52] U.S. Cl. ............ 307/66, 307/75, 307/85, 320/2
[51] Int. Cl. ............................................ H02j 9/04
[58] Field of Search ....... 307/23, 26, 38, 64, 66, 75, 307/85; 310/50; 320/2, 4; 321/8 R; 318/139

[56] References Cited
UNITED STATES PATENTS

| | | | |
|---|---|---|---|
| 3,184,775 | 5/1965 | Downey et al. | 320/2 X |
| 3,316,417 | 4/1967 | Tolmie | 320/2 X |
| 3,089,071 | 5/1963 | Hartwig | 320/2 |
| 3,136,115 | 6/1964 | Calabrese | 307/66 X |
| 3,539,898 | 11/1970 | Tolmie | 320/2 X |

*Primary Examiner*—A. D. Pellinen
*Attorney, Agent, or Firm*—Mark H. Sparrow

[57] ABSTRACT

An arrangement in which a center-tapped transformer supplies power for operating a DC motor, as well as charging a battery. Alternating current from the secondary winding of the transformer is rectified through one diode mounted within the transformer unit, and a second diode mounted within the unit carrying the motor. The transformer unit is connected with a three wire plug to the load means, for example, a motor or appliance unit. When the transformer unit is not connected to the applicance unit, the battery operates the motor.

12 Claims, 4 Drawing Figures

DIRECT CURRENT POWER SUPPLY FOR ELECTRICAL APPLIANCES

BACKGROUND OF THE INVENTION

In the use of small electrical appliances, particularly those that are portable, it is desirable to have the optional features of operating the appliance from a battery carried within the appliance, or from a utility outlet supplying 120 volts AC, for example. When operating the appliance from a battery, it is desirable, at the same time, to provide a rechargeable battery so that a new battery need not be installed into the appliance whenever the energy of the battery has been consumed or depleted.

In the past, recharging of batteries within appliances has been accomplished through substantially complex circuits requiring a large number of diodes and interconnections for full wave rectification and operation of the appliance from either battery or alternating current supply.

SUMMARY OF THE INVENTION

It is an object of the present invention to provide an arrangement for supplying an appliance with DC electrical power through full wave rectification of an alternating current supply.

It is also an object of the present invention to provide an arrangement of the foregoing character for charging a battery within the appliance, used for operating the motor when not connected to the alternating current supply.

A further object of the present invention is to provide the arrangement, as set forth, with a minimum number of interconnections and components required for full wave rectification of the alternating current supply.

It is also an object of the present invention to provide the arrangement of the foregoing character which may be economically fabricated and assembled.

A still further object of the present invention is to provide the foregoing arrangement which is reliable in operation and may be readily maintained.

The objects of the present invention are achieved by providing a power supply unit containing a center tapped transformer having a diode connected in series with one end terminal of the secondary winding of the transformer. A second diode mounted within the appliance to be furnished with power from the power supply unit, is connected in series with the other end terminal of the secondary winding, when the power supply unit is connected to the appliance. The two diodes operate in conjunction with the center tapped transformer to provide full wave rectification of the alternating current applied to the primary winding of the transformer. The resulting full wave rectified DC supply is applied to the appliance when the power supply unit is connected to the appliance. A switch in the appliance may be actuated to disconnect the power consuming element within the appliance, as for example a motor, and connect the battery within the appliance to the power supply unit for the purpose of charging the battery. This battery is used to operate the motor when the power supply unit is not connected to the appliance, and when the switch is actuated so as to operate the appliance. The power supply unit becomes connected to the appliance through a three-wire plug or connector.

Various specific purposes, features, and advantages will appear from the detailed description given below, taken in connection with the accompanying drawing which forms part of this specification and illustrates merely by way of example, certain embodiments of the power supply unit according to the invention.

DESCRIPTION OF THE PREFERRED EMBODIMENTS

Figure 1:
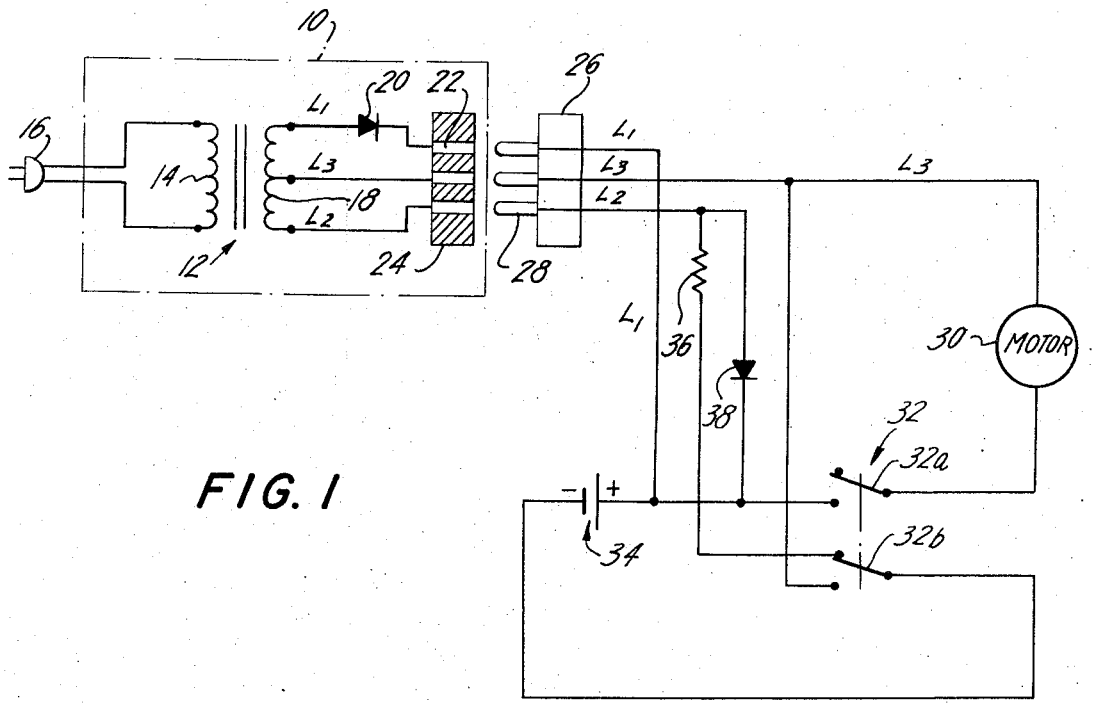
FIG. 1 is an electrical schematic diagram showing the component, an electrical interconnection for supplying an appliance with DC power and charging a battery within the appliance in accordance with the present invention.

Referring to the drawing, the power supply unit 10 has a transformer 12 with primary winding 14 connected to a plug 16 suitable for insertion into an electrical utility outlet. The secondary winding 18 of the transformer has a center tap denoted by line $L_3$. The remaining terminals of the secondary winding are designated by $L_1$ and $L_2$. The terminal or line $L_1$ of the secondary winding has connected in series with it a diode or rectifier 20. The three lines $L_1$, $L_2$, $L_3$, are connected to female connector elements 22, embedded within a non-conductive connector portion 24. The elements 22 are made of electrical conductive material.

The appliance to be operated has a male connector portion 26, which supports conductive pins 28 designed to mate with the female socket-type elements 22. The connector portion 26 is keyed with respect to the connector portion 24, so that these two portions can be assembled in only one specific manner whereby the line $L_1$ in the power supply 10 is always connected to the line designated $L_1$ within the appliance and connected to the respective pin of the plug portion 26. Such keying arrangement, with regard to connectors, is well known in the art. Such a keying arrangement may, for example, be accomplished to simply providing that the three pins 28 are of different diameter, and the elements 22 are correspondingly of different diameter for mating with their respective pins.

The line $L_3$ from the connector portion 26, is connected directly to one terminal of a motor 30 in the appliance. Thus, the motor 30 in this illustrated embodiment, serves as the power consuming element. The appliance can be of any design and functional operation, as for example, an electric shaver, a toothbrush, or similar such devices. At the same time, the power consuming element within the appliance need not be confined to being a motor. A heating element, as represented by a resistor, may also be used in the appliance as the power consuming element or load means.

The other terminal of the motor 30 is connected to a double pole-double throw switch 32. One pole 32a of this switch, connects the motor 30 to one terminal of a battery 34, when the switch is actuated. The other terminal, or negative terminal of the battery 34, is connected to the line L₃ leading to the motor when the switch 32 is actuated. Thus, the pole 32b of the switch, functions together with pole 32a to connect the battery 34 directly across the motor 30, when the switch 32 is actuated.

Figure 4:
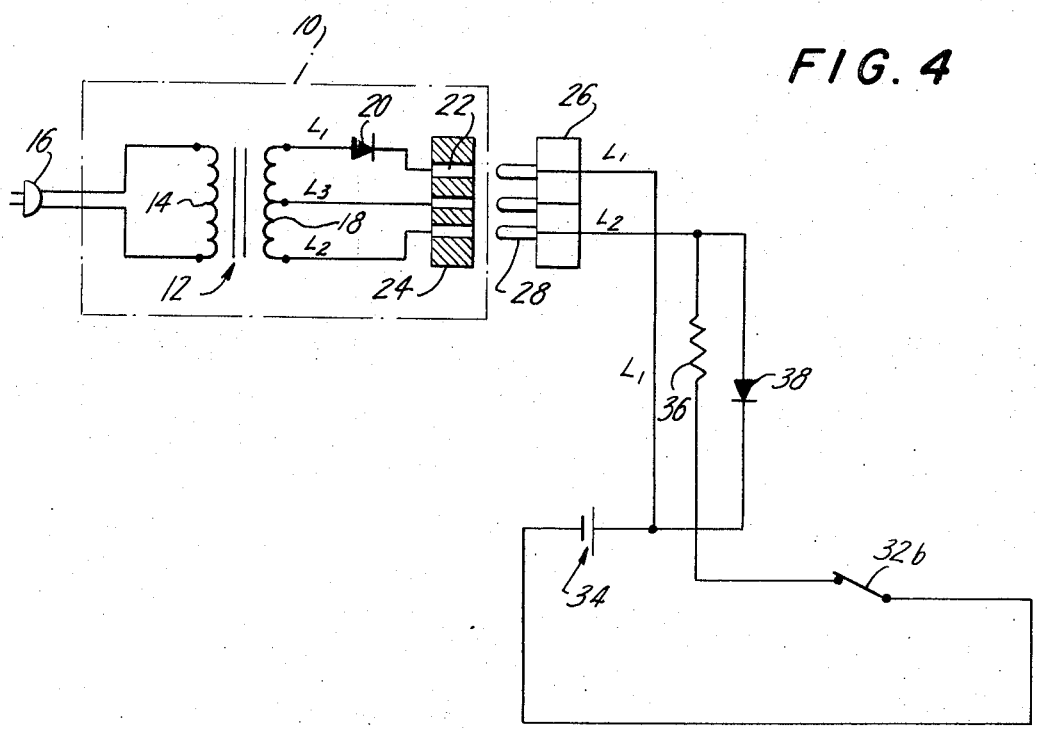
FIG. 4 is an equivalent circuit diagram of the operable circuit paths of the arrangement of FIG. 1, when the battery is charged while the appliance is non-operative.

When switch 32 is in the unactuated state (FIG. 1), and connector portions 24 and 26 are mated or assembled together, the motor 30 is disconnected from operation while the battery 34 is connected across line $L_1$ and $L_2$ (FIG. 4). Thus, in this unactuated position of switch 32, the battery 34 is substantially connected across the end terminals of the secondary winding 18 of the transformer 12. A resistor 36, connected in series with the battery, when the latter is connected across the secondary winding in the aforementioned manner, serves to limit or trim the current, as required for charging the batteries. Thus, when the battery is connected across the secondary winding 18, the battery 34 is in the process of being charged. The diode 20 serves as a half wave rectifier and provides, thereby, pulsating DC for charging the battery.

Figure 2:
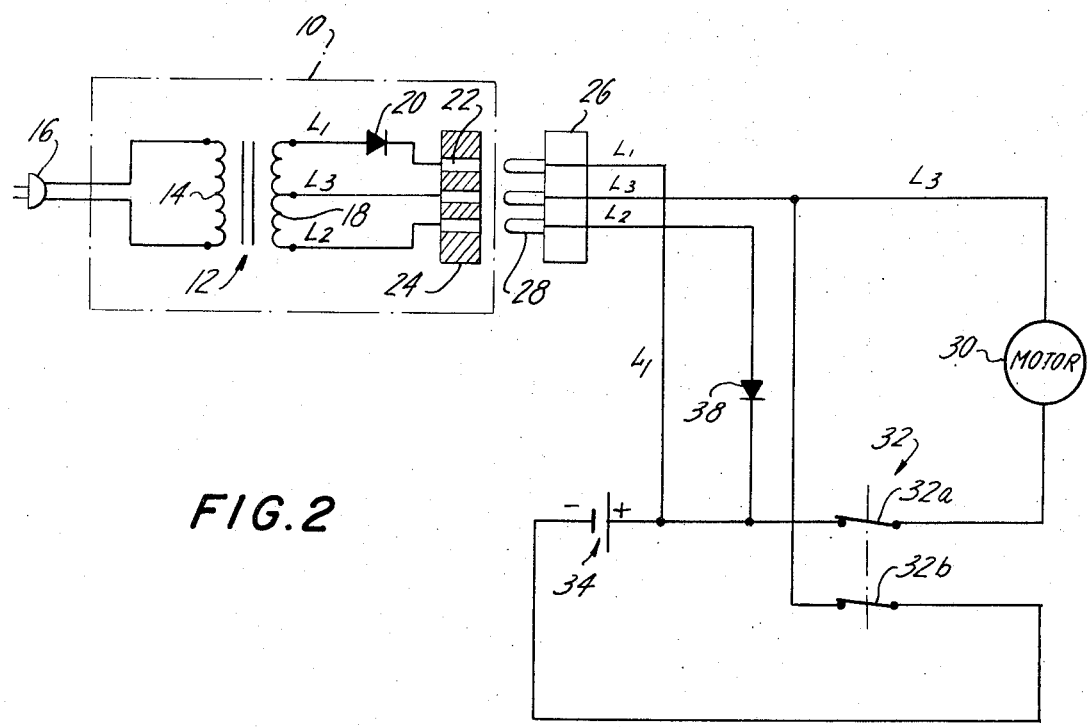
FIG. 2 is an equivalent circuit diagram of the operable circuit paths of the arrangement of FIG. 1, when the appliance is supplied with DC power from an external source.

When the switch 32 is actuated (FIG. 2) while the connector portions 24 and 26 are engaged, the motor 30 is connected across lines $L_1$ and $L_3$. In this state of operation, a diode 38 cooperates with the diode 20 to function as a full wave rectifier for the alternating current applied to the primary winding 14 of the transformer 12. Accordingly, the motor 30 has applied to it full-wave rectified power. During this state of operation, furthermore, the battery 34 is connected across lines $L_1$ and $L_3$. As a result, the battery is connected to half of the secondary winding, with full-wave rectification being applied to the battery with the motor in operation.

Figure 3:
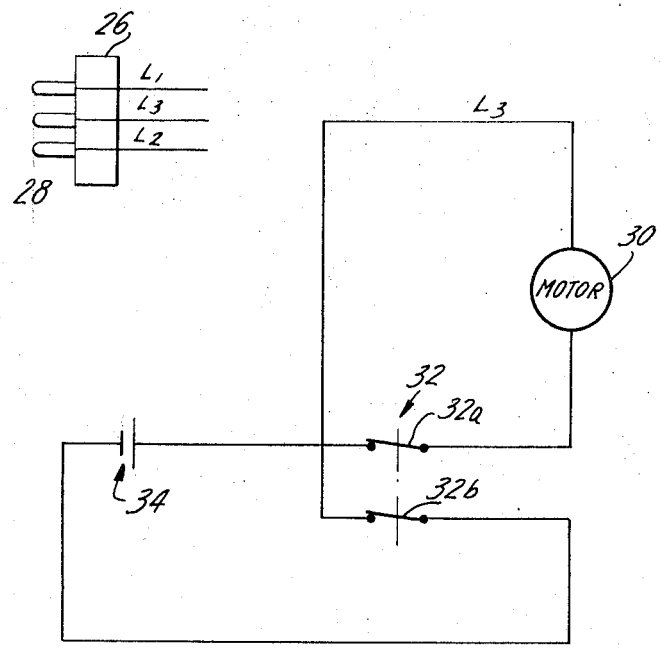
FIG. 3 is an equivalent circuit diagram of the operable circuit paths of the arrangement of FIG. 1, when the appliance is supplied with DC power from the battery within the appliance.

Should the connector portions 22 and 26 not be engaged and the switch 32 be actuated (FIG. 3), then battery 34 is applied directly across motor 30, so that the motor derives, under this state of operation, its power directly from the battery.

Assuming that battery 34 is a rechargeable nickel-cadmium cell, it is desirable to apply between 1.30 and 1.35 volts across the battery during the state of operation when the motor is turning, as a result of the switch 32 being actuated. This will prevent the battery from being drained or discharged while the connector portions 24 and 26 are engaged, and the motor 30 is in operation.

When, on the other hand, battery 34 is being charged, it is desirable to apply substantially twice the nominal voltage of the battery, at half-wave rectification. Such method of charging the nickel-cadmium battery, results in substantially constant charging current. Thus, with twice the nominal voltage supplied for charging the battery, a charging current varies by a substantially small magnitude as the battery voltage increases. Such charging method is applicable, for example, to a sealed nickel-cadmium cell, the most common of which is the one designed with a 10 hour charge rate. Whenever the battery is in the process of being charged, the motor 30 is disconnected from power and is not in operation.

Through the interconnections of switch 32 with the operating elements of the present invention, the battery is charged with substantially twice the voltage and has half-wave rectification, as described supra. The design of the present invention, furthermore, provides full-wave rectification to the application of only two diodes in conjunction with a center tapped transformer. This design provides, moreover, a minimum number of interconnections between the appliance and the power supply unit 10, by requiring only three interconnecting lines, and a corresponding three pin connector.

While the invention has been described and illustrated with respect to certain preferred examples which give satisfactory results, it will be understood by those skilled in the art after understanding the principle of the invention, that various changes and modifications may be made without departing from the spirit and scope of the invention, and it is intended therefore in the appended claims to cover all such changes and modifications.

What is claimed is:

1. A power supply arrangement, comprising in combination, transformer means with primary winding connected to a supply of alternating current and secondary winding having a center tap; first rectifying means connected to one terminal of said secondary winding; switch means connected to said secondary winding and said center tap; load means connected by said switch means to said secondary winding in a first operating state, said switch means disconnecting said load from said secondary winding in a second operating state; battery means connected to said switch means for being charged by power from said secondary winding and through said first rectifying means when said switch means is in said second operating state, said battery means being charged with half-wave rectified alternating current; and second rectifying means connected between said switch means and said secondary winding for applying full-wave rectified alternating current to said load means in said first operating state, said load means receiving full-wave rectified current through said first and second rectifying means and said battery means being connected to half of said secondary through said switch means in said first operating state, said battery means being connected across both halves of said secondary winding when charged with half-wave rectified alternating current in said second operating state.

2. The arrangement as defined in claim 1, wherein said first rectifying means and said second rectifying means comprise diode means.

3. The arrangement as defined in claim 1, including connector means between said switch means and said secondary winding, said first rectifying means being connected in series with one terminal of said secondary winding.

4. The arrangement as defined in claim 3, wherein said second rectifying means is connected between said connector means and said switch means.

5. The arrangement as defined in claim 3, wherein said connector means comprises a three-pin connector.

6. The arrangement as defined in claim 3, wherein said battery means is connected across said load means in said first operating state when said connector means is disengaged.

7. The arrangement as defined in claim 1, including resistor means connected in series with said battery means for limiting the charging current to said battery means.

8. The arrangement as defined in claim 1, wherein said battery means comprises a nickel-cadmium rechargeable battery.

9. The arrangement as defined in claim 1, wherein said battery means is charged with a voltage comprising substantially twice the nominal voltage of said battery means.

10. The arrangement as defined in claim 1 wherein said battery means is connected in parallel with said load means in said first operating state, said battery means maintaining substantially constant the voltage across said load means upon fluctuations in voltage of said supply of alternating current.

11. The arrangement as defined in claim 1 wherein said battery means is connected in parallel with said load means in said first operating state, the charge of said battery means being deficient when a decrease in voltage of said supply of alternating current incurs a decrease in power supplied to said load means.

12. A power supply arrangement comprising, in combination, transformer means with primary winding connected to a supply of alternating current and secondary winding having a center tap; first rectifying means connected to one terminal of said secondary winding; double-pole, double-throw switch means connected to said secondary winding and said center tap; load means connected by said double-pole, double-throw switch means to said secondary winding in a first operating state, said switch means disconnecting said load means from said secondary winding in a second operating state; battery means connected to said switch means for being charged by power from said secondary winding and through said first rectifying means when said switch means is in said second operating state, said battery means being charged with half-wave rectified alternating current; and second rectifying means connected between said switch means and said secondary winding for applying full-wave rectified alternating current to said load means in said first operating state.

* * * * *